(12) United States Patent
Melchiors et al.

(10) Patent No.: US 7,495,053 B2
(45) Date of Patent: Feb. 24, 2009

(54) LOW-SOLVENT, OH-FUNCTIONAL DISPERSIONS

(75) Inventors: Martin Melchiors, Leichlingen (DE); Thomas Münzmay, Dormagen (DE); Thomas Stingl, Montabaur (DE); Hartmut Ottensmann, Düsseldorf (DE)

(73) Assignee: Bayer MaterialScience AG, Leverkusen (DE)

( * ) Notice: Subject to any disclaimer, the term of this patent is extended or adjusted under 35 U.S.C. 154(b) by 291 days.

(21) Appl. No.: 11/013,137

(22) Filed: Dec. 15, 2004

(65) Prior Publication Data
US 2005/0143516 A1 Jun. 30, 2005

(30) Foreign Application Priority Data
Dec. 24, 2003 (DE) ................ 103 61 274

(51) Int. Cl.
*C08L 33/08* (2006.01)
(52) U.S. Cl. ............ 524/531; 524/548; 525/186; 525/327.7; 525/328.8; 525/386
(58) Field of Classification Search ........... 524/531, 524/548; 525/186, 327.7, 328.8, 386
See application file for complete search history.

(56) References Cited

U.S. PATENT DOCUMENTS

| 4,140,664 | A |   | 2/1979  | Mizuguchi et al. | 260/29.4 |
|-----------|---|---|---------|------------------|----------|
| 4,423,165 | A |   | 12/1983 | Harper et al.    | 523/409  |
| 4,539,362 | A |   | 9/1985  | Davies et al.    | 524/458  |
| 4,546,046 | A | * | 10/1985 | Etzell et al.    | 428/460  |
| 4,981,921 | A | * | 1/1991  | Blum et al.      | 525/419  |
| 5,252,696 | A |   | 10/1993 | Laas et al.      | 528/49   |
| 5,422,421 | A | * | 6/1995  | Hovestadt et al. | 528/355  |
| 5,514,746 | A | * | 5/1996  | Schwarte et al.  | 524/556  |
| 6,429,256 | B1 |  | 8/2002  | Vandevoorde et al. | 524/591 |
| 6,767,958 | B2 |  | 7/2004  | Laas et al.      | 524/840  |
| 7,022,778 | B2 | * | 4/2006 | Bremer et al.    | 525/450  |
| 2002/0052451 | A1 | | 5/2002 | Vandevoorde et al. | 525/533 |
| 2004/0034162 | A1 | | 2/2004 | Laas et al.      | 524/589  |

FOREIGN PATENT DOCUMENTS

| DE | 32 09 421 A1 | 9/1983 |
| DE | 100 07 821 A1 | 8/2001 |
| DE | 202212 | 9/2008 |
| EP | 133 949 B1 | 9/1987 |
| EP | 288 763 B1 | 5/1991 |
| EP | 0 712 873 B1 | 2/1999 |

OTHER PUBLICATIONS

Paint & Resin, Dec. 1983, pp. 34, 35, 37, and 49, G.Y. Talak and Prof. S.P. Pontis, "Thermosetting Acrylic Emulsions".

* cited by examiner

*Primary Examiner*—Bernard Lipman
(74) *Attorney, Agent, or Firm*—Noland J. Cheung; Robert S. Klemz

(57) ABSTRACT

Aqueous, hydroxy-functional binder dispersions with a low solvent content and based on hydroxy-functional copolymers. The binders are prepared by subjecting one or more vinyl monomer mixtures containing OH-free (meth)acrylic esters and/or vinylaromatics, hydroxy-functional vinyl monomers and/or hydroxy-functional (meth)acrylic esters, and ionic and/or potentially ionic monomers capable of free-radical copolymerization, to free-radical polymerization in the presence of at least one compound containing lactone groups and subsequently dispersing the resultant copolymer before or after addition of a neutralizing agent in water. The binder combinations can be used in coating materials.

9 Claims, No Drawings

LOW-SOLVENT, OH-FUNCTIONAL DISPERSIONS

CROSS REFERENCE TO RELATED PATENT APPLICATION

The present patent application claims the right of priority under 35 U.S.C. §119 (a)-(d) of German Patent Application No. 103 61 274.2, filed Dec. 24, 2003.

BACKGROUND OF THE INVENTION

1. Field of the Invention

The invention relates to aqueous, hydroxy-functional binder dispersions with a low solvent content and based on hydroxy-functional copolymers, to a process for preparing such binders, to binder combinations based thereon and to the use of the binders in coating materials.

2. Description of the Prior Art

The use in coating systems (Paint & Resin 12/83, p. 34 ff., DE-A 3 209 421, EP-A 95 263, EP-A 105 293, EP-A 133 949, EP-A 288 763, DE-A 202 212 and literature cited therein) of copolymer-based, water-dilutable binders is known. Generally, however, these systems include emulsifiers for stabilizing and/or relatively large fractions of organic cosolvents.

The emulsifiers normally affect the properties of the coating materials or of the coatings, such as water resistance, film appearance (gloss), pigmentability, for example, adversely.

The use of relatively large amounts of organic solvents is undesirable on environmental grounds. Generally, however, it cannot be avoided in order to ensure sufficient stirrability and heat removal from the reaction mixture in the course of polymer preparation and also to ensure a certain minimum filling level of the reactor. Organic solvents additionally lead in aqueous coating materials to advantageous effects such as enhanced storage stability, pigment wetting, film appearance and levelling.

Removing subsequently from copolymers or copolymer dispersions the solvents present therein for process-related reasons entails much energy consumption and great complexity of apparatus, and hence also high costs, so that there is a need for aqueous polymer dispersions in whose preparation the use of organic solvents can be largely avoided without impairment to the performance properties.

Copolymer dispersions which are to be cured by means of a chemical reaction, as for example with an amino resin, a blocked polyisocyanate or a polyisocyanate, must contain a certain amount of reactive groups, hydroxyl groups for example. These groups are generally incorporated into the copolymer through the use of hydroxy-functional (meth) acrylic esters during the copolymerization. In comparison to the non-functional (meth)acrylic esters or else to styrene, however, these raw materials are very expensive. Additionally it is often necessary to use relatively large amounts of these raw materials as compared with copolymers in organic solution, in order to compensate the hydrophilicity of the coating films by means of a relatively large crosslinking density.

One way to prepare hydroxy-functional secondary copolymer dispersions that largely avoids the use of solvents in the polymerization is shown by the teaching of EP-A 0 758 007. According to that publication the solvents normally used are replaced in whole or in part by hydroxy-functional polyethers. The hydroxy-functional polyethers remain as reactive diluents in the secondary dispersion and in the course of subsequent crosslinking they too react with isocyanates or blocked isocyanates to form urethane. Consequently they do not contribute to the VOC. A disadvantage experienced with these products, however, is their poor stability.

SUMMARY OF THE INVENTION

The present invention is directed to a process for preparing copolymer dispersions that includes subjecting one or more vinyl monomer mixtures containing OH-free (meth)acrylic esters and/or vinylaromatics, hydroxy-functional vinyl monomers and/or hydroxy-functional (meth)acrylic esters, and ionic and/or potentially ionic monomers capable of free-radical copolymerization, to free-radical polymerization in the presence of at least one compound containing lactone groups and subsequently dispersing the resultant copolymer before or after addition of a neutralizing agent in water.

The present invention is also directed to copolymer dispersions obtained by the above-described process and a method of producing coatings that includes mixing the copolymer dispersions with at least one OH-reactive crosslinker.

The present invention is further directed to an aqueous coating composition that includes one or more copolymer dispersions described above and at least one OH-reactive crosslinker and to substrates coated with the coating compositions.

The present invention is additionally directed to crosslinkers obtained from the above-described copolymer dispersions.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has now been found that aqueous copolymer dispersions with a low solvent content and a high stability level in the coating films, based on hydroxy-functional copolymers, can be prepared if lactones, in conjunction if desired with low molecular weight polyols, are used as reactive diluents.

The invention accordingly provides a process for preparing copolymer dispersions by subjecting A) one or more vinyl monomer mixtures comprising
 a) OH-free (meth)acrylic esters and/or vinylaromatics,
 b) hydroxy-functional vinyl monomers and/or hydroxy-functional (meth)acrylic esters,
 c) ionic and/or potentially ionic monomers capable of free-radical copolymerization, and
 d) if desired further monomers, other than the compounds of components a)-c), capable of free-radical copolymerization to free-radical polymerization in the presence of
 e) at least one compound containing lactone groups and
 f) if desired, low molecular weight polyols having a number-average molecular weight of from 62 to 250 Da and subsequently dispersing the resultant copolymer
B) before or after addition of a neutralizing agent
C) in water.

The invention further provides the aqueous copolymer dispersions obtainable by the process described above.

As monomers of component a) use is made of acrylates and methacrylates (referred to below as (meth)acrylates) having 1 to 18 carbon atoms in the alcohol moiety of the ester group. This alcohol moiety may be linear aliphatic, branched aliphatic or cycloaliphatic.

Examples of suitable monomers of component a) include methyl, ethyl, n-propyl, n-butyl, isopropyl, isobutyl, t-butyl, the isomeric pentyl, hexyl, 2-ethylhexyl, octyl, dodecyl, hexadecyl, octadecyl or cyclohexyl, trimethylcyclohexyl and isobornyl(meth)acrylates or styrene.

In a) it is additionally possible to use acetoacetoxyethyl methacrylate, acrylamide, acrylnitrile, vinyl ethers, methacrylonitrile, vinyl acetates, optionally substituted styrenes and vinyltoluenes.

Likewise possible is the use of any desired mixtures of the aforementioned compounds in component a).

In component b) it is possible to use polymerizable monomers containing OH groups, such as hydroxyalkyl esters of unsaturated carboxylic acids, for example, preferably hydroxyalkyl(meth)acrylates having 2 to 12, preferably 2 to 6, carbon atoms in the hydroxyalkyl radical.

Examples of such compounds are 2-hydroxyethyl(meth) acrylate, the isomeric hydroxypypropyl(meth)acrylates, 2-, 3- and 4-hydroxybutyl(meth)acrylates and the isomeric hydroxyhexyl(meth)acrylates.

Likewise in b) it is possible to use polymerizable hydroxy-functional monomers chain-extended or modified with alkylene oxides and having a number-average molecular weight $\leq 3\,000$ g/mol, preferably $\leq 500$ g/mol. Alkylene oxides employed for this purpose include preferably ethylene, propylene or butylene oxide, individually or in mixtures.

As ionic and/or potentially ionic monomers of component c), capable of free-radical copolymerization, it is possible to use olefinically unsaturated monomers containing carboxylic acid or carboxylic anhydride groups, such as acrylic acid, methacrylic acid, β-carboxyethyl acrylate, crotonic acid, fumaric acid, maleic anhydride, itaconic acid or monoalkyl esters of dibasic acids or anhydrides such as monoalkyl maleates, for example, preference being given to acrylic acid and/or methacrylic acid.

Also suitable as compounds of component c), additionally, are unsaturated, free-radically polymerizable compounds containing phosphate or phosphonate or sulphonic acid or sulphonate groups, as described for example in WO-A 00/39181 (p. 8 line 13-p. 9 line 19), especially 2-acrylamido-2-methylpropanesulphonic acid.

Optionally it is also possible to use further monomers capable of free-radical copolymerization as compounds of component d). These may be, for example, (meth)acrylate monomers and/or vinyl monomers with a functionality of two or more, such as hexanediol di(meth)acrylate or divinylbenzene, for example. A further possibility is the addition of polymerizable compounds which have a non-ionically hydrophilicizing effect, such as acrylates of hydroxy-functional polyalkylene oxide ethers.

Preferably the copolymers are hydrophilicized only through ionic and/or potentially ionic groups.

The proportions of the synthesis components a) to d) are typically chosen so as to give an OH number of from 12 to 200 mg KOH/g, preferably from 25 to 150 mg KOH/g and more preferably from 50 to 150 mg KOH/g solids and an acid number of from 0 to 50 mg KOH/g, preferably from 10 to 30, more preferably from 15 to 25 mg KOH/g, based on the copolymer.

Preferably for that purpose, based on the copolymer, 50-85% by weight of component a), 15-40% by weight of component b), 0.5-5% by weight of component c) and 0-34.5% by weight of component d) are chosen so as to give copolymers which in terms of OH number and acid number conform to the above specifications, with the amounts from the above ranges adding up to 100% by weight.

Suitable compounds of component e) containing lactone groups include all lactones known to the person skilled in the art. Preference is given to butyrolactone, valerolactone and ε-caprolactone and also their arbitrary mixtures with one another. Particular preference is given to using in e) ε-caprolactone.

The low molecular weight polyols of component f) are the hydroxy-functional compounds known per se to the person skilled in the art, having a molecular weight of from 62 to 250 Da and an average hydroxyl functionality of preferably more than 1.5, more preferably from 2 to 4.

Examples of low molecular weight polyols of this kind are ethanediol, di-, tri- and tetraethylene glycol, 1,2-propanediol, di-, tri- and tetrapropylene glycol, 1,3-propanediol, butane-1,4-diol, butane-1,3-diol, butane-2,3-diol, pentane-1,5-diol, hexane-1,6-diol, 2,2-dimethyl-1,3-propanediol, 1,4-dihydroxycyclohexane, 1,4-dimethylolcyclohexane, octane-1,8-diol, decane-1,10-diol, dodecane-1,12-diol, glycerol, trimethylolethane, trimethylolpropane, pentaerythritol, dipentaerythritol and mixtures thereof.

The procedure for polymerizing unsaturated monomers is familiar to the person skilled in the art. Typically for that purpose components e) and f) as reactive diluents are charged to a reaction vessel and the unsaturated monomers are polymerized therein using a free-radical initiator.

If desired it is possible to employ additional organic solvents in minor amounts. Suitable auxiliary solvents are any solvents known in paint technology, such as alcohols, ethers, alcohols containing ether groups, esters, ketones, N-methylpyrrolidone or non-polar hydrocarbons and/or mixtures of these solvents. The solvents are used in amounts such that their concentration in the finished dispersion is from 0 to 5% by weight. If necessary the solvents used can be removed again partly by means of distillation. In one preferred embodiment, however, the use of additional organic solvents is omitted entirely.

The copolymerization is conducted generally at from 40 to 200° C., preferably from 60 to 180° C., more preferably from 80 to 160° C.

Suitable initiators for the polymerization reaction include organic peroxides such as di-tert-butyl peroxide or tert-butyl peroxy-2-ethylhexanoate and azo compounds such as azodiisobutyronitrile (AIBN). The amounts of initiator used depend on the desired molecular weight. For reasons of operational reliability and greater ease of handling it is also possible to employ peroxide initiators in the form of a solution in suitable organic solvents of the type mentioned above.

In one preferred embodiment of the process there is a two-stage addition and polymerization of unsaturated monomers of the aforementioned kind in the presence of the diluents e) and f). In that case in a first step (I) a hydroxy-functional copolymer having an OH number of from 12 to 200 mg KOH/g solids and an acid number of from 0 to 50 mg KOH/g solids, consisting of 55-90% by weight of component a), 2.5-50% by weight of component b), 0-6.5% by weight of component c) and 0-42.5% by weight of component d), is prepared. In a subsequent step (II) the reaction mixture obtained from step (I) is used to prepare a further polymer from monomers of components a)-d), this polymer having an OH number of from 20 to 200 mg KOH/g solids and an acid number of from 50 to 200 mg KOH/g solids. The polymer from step (II) is composed of 45-80% by weight of component a), 5-50% by weight of component b), 6.5-25% by weight of component c) and 0-43.5% by weight of component d). The percentages for the polymer composition add up to 100% by weight per polymer. The monomer amounts of the two polymer preparations are to be chosen such that the mass ratio of the polymer from step (I) to that from step (II) is from 10:1 to 1:2, preferably from 6:1 to 2:1.

Instead of a multistage polymerization process it is likewise possible to conduct the operation continuously (gradient polymerization); in other words a monomer mixture with a composition which changes in accordance with the composition of the copolymer or copolymers A) is added, in which case the hydrophilic monomer fractions in accordance with components c) and optionally d) are preferably higher towards the end of the feed than at the beginning.

The copolymers obtainable by the process of the invention have number-average molecular weights $M_n$ of from 500 to 30 000 g/mol, preferably from 1000 to 15 000 g/mol, more preferably from 1500 to 10 000 g/mol.

Before, during or after the dispersing of the hydroxy-functional copolymers A) in water (step C)) the acid groups present are at least proportionally converted into their salt form by adding suitable neutralizing agents (step B)). Suitable neutralizing agents include organic amines or water-soluble inorganic bases, such as soluble metal hydroxides, metal carbonates or metal hydrogencarbonates, for example.

Examples of suitable amines are N-methylmorpholine, triethylamine, ethyldiisopropylamine, N,N-dimethylethanolamine, N,N-dimethylisopropanolamine, N-methyldiethanolamine, diethylethanolamine, triethanolamine, butanolamine, morpholine, 2-aminomethyl-2-methylpropanol or isophoronediamine. In mixtures it is also possible proportionally to use ammonia. Particular preference is given to triethanolamine, N,N-dimethylethanolamine and ethyldiisopropylamine.

The neutralizing agents are added in B) in amounts such that in total a theoretical degree of neutralization [of the acid groups] of from 40 to 150% is present, preferably from 60 to 120%. The degree of neutralization therefore works out to be the ratio of added basic groups of the neutralizing component from B) to acid functions of the copolymer. The pH of the aqueous binder dispersion of the invention is from 6 to 10, preferably from 6.5 to 9.

The aqueous, hydroxy-functional binder dispersions of the invention have a solids content of from 25 to 70% by weight, preferably from 35 to 60% by weight, more preferably from 50 to 59% by weight, and an organic solvent content of from 0 to 12% by weight, preferably from 1 to 3.5% by weight.

The binder dispersions of the invention can be processed to aqueous coating materials. By combination with crosslinkers it is possible in that case, depending on the reactivity or, where appropriate, blocking of the crosslinkers, to prepare not only one-component coating materials but also two-component coating materials. One-component coating materials for the purposes of the present invention are coating compositions wherein binder component and crosslinker component can be stored together without any crosslinking reaction taking place to a marked extent or to an extent detrimental to subsequent application. The crosslinking reaction does not take place until the time of application, after the crosslinker has been activated. This activation can be brought about, for example, through an increase in temperature. Two-component coating materials for the purposes of the present invention are coating compositions wherein binder component and crosslinker component have to be stored in separate vessels on account of their high reactivity. The two components are not mixed until shortly before application, when they react generally without additional activation. In order to accelerate the crosslinking reaction, however, it is also possible to use catalysts or to employ relatively high temperatures.

The present invention hence also provides aqueous coating compositions at least comprising
i) one or more copolymer dispersions obtained by the process described herein, and
ii) at least one OH-reactive crosslinker.

Examples of suitable OH-reactive crosslinkers are polyisocyanate crosslinkers, amide and amine formaldehyde resins, phenolic resins, aldehyde resins and ketone resins, such as phenol-formaldehyde resins, resoles, furan resins, urea resins, carbamic ester resins, triazine resins, melamine resins, benzoguanamine resins, cyanamide resins and analine resins, as described in "Lackkunstharze", H. Wagner, H. F. Sarx, Carl Hanser Verlag Munich, 1971.

Preferred crosslinkers used are blocked or non-blocked polyisocyanates. Such polyisocyanates typically have two or more NCO groups per molecule and are based for example on isophorone diisocyanate, hexamethylene diisocyanate, 1,4-diisocyanatocyclohexane, bis(4-isocyanatocyclohexane)methane, 1,3-diisocyanatobenzene, triisocyanatononane or the isomeric 2,4- and 2,6-TDI and may further contain urethane, isocyanurate and/or biuret groups.

Particular preference is given to using low-viscosity, optionally hydrophilicized polyisocyanates of the aforementioned kind based on aliphatic or cycloaliphatic isocyanates.

The polyisocyanates used as crosslinkers generally have a viscosity at 23° C. of from 10 to 5000 mPas and if desired for viscosity adjustment may also be employed as a blend with small amounts of inert solvents.

The copolymers essential to the invention are generally sufficiently hydrophilic to allow even hydrophobic crosslinker resins to be dispersed without additional emulsifiers. The use of external emulsifiers, however, is not ruled out as a result of this.

Water-soluble or dispersible polyisocyanates are obtainable, for example, by modification with carboxylate, sulphonate and/or polyethylene oxide groups and/or polyethylene oxide/polypropylene oxide groups. Hydrophilicization of the polyisocyanates is possible, for example, by reaction with substoichiometric amounts of monohydric, hydrophilic polyether alcohols. The preparation of hydrophilicized polyisocyanates of this kind is described for example in EP-A 0 540 985 (p. 3, line 55 to p. 4 line 5).

Also highly suitable are the polyisocyanates containing allophanate groups that are described in EP-A 959 087 (p. 3 lines 39 to 51), which are prepared by reacting low-monomer-content polyisocyanates with polyethylene oxide polyether alcohols under allophanatization conditions. Also suitable are the water-dispersible polyisocyanate mixtures based on triisocyanatononane and described in DE-A 100 078 21 (p. 2 line 66 to p. 3 line 5), and also polyisocyanates hydrophilicized with ionic groups (sulphonate groups, phosphonate groups), as described for example in DE 100 24 624 (p. 3 lines 13 to 33).

In principle it is of course also possible to use mixtures of different crosslinker resins.

Before, during or after the preparation of the aqueous, hydroxy-functional binder dispersion of the invention it is possible to add the customary auxiliaries and additives of paint technology, such as defoamers, thickeners, pigments, dispersing assistants, catalysts, anti-skinning agents, anti-settling agents or emulsifiers, for example.

These auxiliaries and additives may also be added to the coating composition comprising the aqueous, hydroxy-functional binder dispersions of the invention.

The aqueous coating compositions comprising the aqueous, hydroxy-functional copolymer dispersions of the invention are suitable for all fields of use in which aqueous paint and coating systems with exacting requirements imposed on film stability are employed; for example, for the coating of mineral surfaces of building materials, and the coating and sealing of wood and wood-derived materials, coating of metallic surfaces (metal coating), coating and painting of asphaltic or bitumenous coverings, painting and sealing of various plastics surfaces (plastics coating) and also high-gloss coating materials.

Since coating compositions comprising the copolymer dispersions essential to the invention lead to coatings having a very high level of properties, they are also suitable for producing crack-bridging coatings, preferably in the building sector and on mineral substrates.

The aqueous coating compositions comprising the aqueous, hydroxy-functional binder dispersions of the invention are employed for producing primers, surfacers, pigmented or transparent topcoat materials, clearcoat materials and high-gloss coating materials, and also one-coat materials, that may be employed in individual application and mass application, in the field of industrial coating, automotive OEM finishing and automotive refinish, for example.

It is preferable the aqueous coating compositions comprising the aqueous hydroxy-functional binder dispersions of the invention for coating or painting mineral surfaces, wood and plastics.

The coating compositions of the invention are cured typically at temperatures of from 0 to 140° C., preferably from 18 to 80° C.

These coatings combine a very good film appearance with a high level of solvent and chemicals resistance, good weathering stability, high hardness and rapid drying.

The coatings can be produced by a variety of spraying techniques such as, for example, air-pressure spraying, airless spraying or electrostatic spraying techniques using one-component or, where appropriate, two-component spraying units. The coating materials and coating compositions comprising the aqueous, hydroxy-functional binder dispersions of the invention can also be applied by other methods, however—for example, by brushing, rolling or knifecoating.

EXAMPLES

Unless indicated otherwise, all percentages are by weight.

Viscosity measurements were carried out using a cone and plate viscometer Viscolab LC3 ISO from Physica, Stuttgart, Germany in accordance with DIN 53019 at a shear rate of 40 $s^{-1}$.

The average particle size was determined by means of laser correlation spectroscopy (Zetasizer® 1000, Malvern Instruments, Herrenberg, Germany).

The OH numbers reported were calculated starting from the monomers employed.

Acid numbers: Determination method, DIN ISO 3682

Dowanol® PnB: Propylene glycol n-butyl ether, Dow Chemicals, Midland, USA.

Peroxan® DB: Di-tert-butyl peroxide, Pergan GmbH, Bocholt, Germany.

Example 1

A 15 l reaction vessel with stirring, cooling and heating apparatus was charged with 819 g of ε-caprolactone together with 321 g of trimethylolpropane and 185 g of Dowanol® PnB and this initial charge was heated to 138° C. At that temperature a solution of 14.5 g of di-tert-butyl peroxide in 14.5 g of Dowanol® PnB was added over the course of 20 minutes. Thereafter a monomer mixture of 256 g of styrene, 666 g of methyl methacrylate, 1245 g of hydroxyethyl methacrylate, 613 g of butyl methacrylate, 658 g of isobornyl methacrylate and 170 g of butyl acrylate and, in parallel, a solution of 70.5 g of di-tert-butyl peroxide in 70.5 g of Dowanol® PnB were metered in at a uniform rate over the course of 4.5 hours. This temperature was maintained for 20 minutes. Thereafter a monomer mixture of 232.5 g of methyl methacrylate, 328.5 g of hydroxyethyl methacrylate, 182.5 g of butyl acrylate and 109 g of acrylic acid and, in parallel, a solution of 14.5 g of di-tert-butyl peroxide in 30 g of Dowanol® PnB were metered in at a uniform rate over the course of 1.5 hours. This was followed by stirring at 138° C. for an hour, then by cooling to 100° C. and by the addition of 143 g of N,N-dimethylethanolamine. After 30 minutes of homogenization, dispersion was carried out with 6080 g of water over the course of 2 hours at 80° C. This gave a copolymer dispersion having the following data:

| | |
|---|---|
| OH content$_{theoretical}$ (solids without N,N-dimethylethanolamine) | 5.7% |
| Acid number (solids) | 17 mg KOH/g |
| Solids content | 47% |
| Viscosity | 1250 mPas/23° C. |
| pH (10% strength in water) | 8.1 |
| Degree of neutralization | 105% |
| Average particle size | 140 nm |

Example 2

A 15 l reaction vessel with stirring, cooling and heating apparatus was charged with 1436 g of ε-caprolactone together with 844 g of trimethylolpropane and 370 g of Dowanol® PnB and this initial-charge was heated to 138° C. At that temperature a solution of 14.5 g of di-tert-butyl peroxide in 14.5 g of Dowanol® PnB was added over the course of 20 minutes. Thereafter a monomer mixture of 256 g of styrene, 666 g of methyl methacrylate, 1245 g of hydroxyethyl methacrylate, 613 g of butyl methacrylate, 658 g of isobornyl methacrylate and 170 g of butyl acrylate and, in parallel, a solution of 70.5 g of di-tert-butyl peroxide in 70.5 g of Dowanol® PnB were metered in at a uniform rate over the course of 4.5 hours. This temperature was maintained for 20 minutes. Thereafter a monomer mixture of 232.5 g of methyl methacrylate, 328.5 g of hydroxyethyl methacrylate, 182.5 g of butyl acrylate and 109 g of acrylic acid and, in parallel, a solution of 14.5 g of di-tert-butyl peroxide in 30 g of Dowanol® PnB were metered in at a uniform rate over the course of 1.5 hours. This was followed by stirring at 138° C. for an hour, then by cooling to 100° C. and by the addition of 143 g of N,N-dimethylethanolamine. After 30 minutes of homogenization, dispersion was carried out with 6080 g of water over the course of 2 hours at 80° C. This gave a copolymer dispersion having the following data:

| | |
|---|---|
| OH content$_{theoretical}$ (solids without N,N-dimethylethanolamine) | 7.7% |
| Acid number (solids) | 17 mg KOH/g |
| Solids content | 48% |
| Viscosity | 1200 mPas (23° C. shear rate 40$^{-1}$) |
| pH (10% strength in water) | 8.1 |
| Degree of neutralization | 105% |
| Average particle size | 130 nm |

Example 3

A 6 l reaction vessel with stirring, cooling and heating apparatus was charged with 325 g of ε-caprolactone together with 275 g of trimethylolpropane and this initial charge was heated to 148° C. At that temperature a solution of 8.25 g of di-tert-butyl peroxide in 8.25 g of Dowanol® PnB was added dropwise over the course of 20 minutes. Thereafter a monomer mixture of 365 g of methyl methacrylate, 854 g of hydroxyethyl methacrylate, 600 g of butyl acrylate and 480 g of styrene and, in parallel, a solution of 28.5 g of di-tert-butyl peroxide in 28.5 g of Dowanol® PnB were metered in at a uniform rate over the course of 4.5 hours. This temperature was maintained for about 20 minutes. Thereafter a monomer mixture of 122.25 g of methyl methacrylate, 172.75 g of hydroxyethyl methacrylate, 96 g of butyl acrylate and 84 g of acrylic acid and, in parallel, a solution of 8.25 g of di-tert-butyl peroxide in 20.75 g of Dowanol® PnB were metered in at a uniform rate over the course of 1.5 hours. This was followed by stirring at 148° C. for an hour, then by cooling to 100° C. and by the addition of 174 g of triethanolamine. After 30 minutes of homogenization, dispersion was carried out with 2050 g of water over the course of 2 hours at 80° C. This gave a copolymer dispersion having the following data:

| | |
|---|---|
| OH content$_{theoretical}$ (solids including triethanolamine) | 8.2% |
| Acid number (solids) | 22 mg KOH/g |
| Solids content | 57% |
| Viscosity | 2500 mPas/23° C. |
| pH (10% strength in water) | 7.4 |
| Degree of neutralization | 100% |
| Average particle size | 145 nm |

Example 4

Comparative (EP-A 0 758 007, Example 1)

A 6 l reaction vessel with stirring, cooling and heating apparatus was charged with 116 g of butyl glycol and 150 g of a polyether (Desmophen®V218: propoxylated glycerol; OH number 245 mg KOH/g; Bayer AG, Leverkusen, DE) and this initial charge was heated to 155° C. At that temperature 321 g of butyl acrylate, 366 g of styrene and 198 g of hydroxyethyl methacrylate and, in parallel, a solution of 17.1 g of di-tert-butyl peroxide in 28.6 g of butyl glycol were metered in over the course of 2 hours. Thereafter a monomer mixture of 83 g of hydroxyethyl methacrylate, 180 g of butyl acrylate, 139 g of styrene and 34 g of acrylic acid and, in parallel, 12.9 g of di-tert-butyl peroxide in 21.4 g of butyl glycol were metered in over the course of 1 hour. This was followed by stirring at 150 to 155° C. for 2 hours, then by cooling to 100° C. and by the addition of 50 g of dimethylethanolamine. After 30 minutes of homogenization, dispersion was carried out with 1980 g of water over the course of 2 hours at 80° C. This gave a copolymer dispersion having the following data:

| | |
|---|---|
| OH content$_{theoretical}$ (solids without N,N-dimethylethanolamine) | 3.2% |
| Acid number (solids) | 18 mg KOH/g |
| Solids content | 40% |
| Viscosity | 830 mPas (23° C., shear rate 40$^{-1}$) |
| pH (10% strength in water) | 9.4 |
| Degree of neutralization | 100% |
| Average particle size | 51 nm |
| Solvent content | 4.5% |

Example 5

Resistance Properties

To determine the resistance properties coating compositions as per the table below (amounts in parts by weight) were prepared from the dispersions of examples 3 and 4 and Bayhydur® XP 2451 (hydrophilicized polyisocyanate based on HDI, Bayer AG, Leverkusen, DE) as crosslinkers and were applied with a manual doctor blade to a wooden panel (beech) and cured at room temperature for 24 h.

| Component | Film A | Film B |
|---|---|---|
| Dispersion from example 3 | 100 | |
| Dispersion from example 4 | | 100 |
| Bayhydur ® XP 2451 | 36.3 | 20.8 |

Chemical resistance on the lines of DIN 68861, 210 μm wet film

| Medium and duration | | Film A | Film B |
|---|---|---|---|
| Water | 1 day | 5/2 | 5/2 |
| | 7 days | 5/2 | 4/2 |
| Shoe polish | 5 hours | 5/2 | 4/2 |
| Red wine | 5 hours | 4/2 | 4/2 |
| 98% ethanol | 1 hour | 4/0 | 3/0 |
| 12.5% ammonia | 1 hour | 5/2 | 4/2 |
| Isopropanol | 1 hour | 4/1 | 3/0 |
| | 5 hours | 4/1 | dissolved |

First Value: Marking
5=no visible change; 0=test area severely altered or destroyed Second Value: Residual Hardness
2=unchanged; 0=readily removable mechanically The binder of the invention gave coating films having markedly improved resistance to aggressive media, in particular to ethanol and isopropanol.

Example 6

Gloss

To assess the gloss properties coating compositions as per the table below (amounts in parts by weight) were prepared from the dispersions of examples 3 and 4 and Bayhydur® XP 2451 (hydrophilicized polyisocyanate based on HDI, Bayer AG, Leverkusen, DE) as crosslinkers, were applied with a manual doctor blade to a Leneta chart (polymer film according to DIN 53775, matt black, 430×165 mm, B. Schwegmann GmbH, Gelsdorf, DE) and were cured at room temperature for 24 hours.

| Component | Film C | Film D |
|---|---|---|
| Dispersion from example 3 | 100 | |
| Dispersion from example 4 | | 100 |
| Bayhydur ® XP 2451 | 36.3 | 20.8 |

Gloss measured to DIN 67 530 on clearcoat; 200 µm wet film

| Angle | Film C | Film D |
|-------|--------|--------|
| 20°   | 85%    | 21%    |
| 60°   | 91%    | 55%    |
| 85°   | 98%    | 78%    |

The binder of the invention gave coating films having substantially higher gloss than the comparable prior art binder.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is clamed is:

1. A process for preparing copolymer dispersions comprising
   1) subjecting
      A) one or more vinyl monomer mixtures comprising
         a) OH-free (meth)acrylic esters and/or vinylaromatics,
         b) hydroxy-functional vinyl monomers and/or hydroxy-functional (meth)acrylic esters,
         c) ionic and/or potentially ionic monomers capable of free-radical copolymerization, and
         d) if desired further monomers, other than the compounds of components a)-c), capable of free-radical copolymerization
      to free-radical polymerization in the presence of
         e) at least one compound containing lactone groups and
         f) low molecular weight polyols having a number-average molecular weight of from 62 to 250 Da, and
   2) subsequently dispersing the resultant copolymer
      B) before or after addition of a neutralizing agent
      C) in water.

2. The process for preparing copolymer dispersions according to claim 1, wherein the one or more vinyl monomer mixtures A) have an OH number of from 50 to 150 mg KOH/g solids, an acid number of from 15 to 25 mg KOH/g solids and a number-average molecular weight $M_n$ of from 1500 to 10 000 g/mol.

3. The process for preparing copolymer dispersions according to claim 1, wherein the one or more vinyl monomer mixtures A) are composed of 50-85% by weight of component a), 15-40% by weight of component b), 0.5-5% by weight of component c) and 0-34.5% by weight of component d) and the amounts from the above ranges add up to 100% by weight.

4. The process for preparing copolymer dispersions according to claim 1, wherein ϵ-caprolactone is used in component e).

5. The process for preparing copolymer dispersions according to claim 1, wherein the polymerization is carried out in two stages.

6. The process for preparing copolymer dispersions according to claim 2, wherein the one or more vinyl monomer mixtures A) are composed of 50-85% by weight of component a), 15-40% by weight of component b), 0.5-5% by weight of component c) and 0-34.5% by weight of component d) and the amounts from the above ranges add up to 100% by weight.

7. The process for preparing copolymer dispersions according to claim 2, wherein the polymerization is carried out in two stages.

8. The process for preparing copolymer dispersions according to claim 3, wherein the polymerization is carried out in two stages.

9. The process for preparing copolymer dispersions according to claim 4, wherein the polymerization is carried out in two stages.

* * * * *